(12) United States Patent
Stanton et al.

(10) Patent No.: US 8,970,054 B2
(45) Date of Patent: Mar. 3, 2015

(54) FOOT-POWERED ENERGY HARVESTING MECHANISMS FOR INSOLES AND SHOES

(71) Applicant: Sole Power, LLC, Pittsburgh, PA (US)

(72) Inventors: Matthew James Stanton, Pittsburgh, PA (US); Hahna Alexander, Ithaca, NY (US); Sarah Stroup, Liverpool, NY (US); Arianna Golden, El Sobrante, CA (US); Spencer Williams, Portland, OR (US)

(73) Assignee: Sole Power, LLC, Pittsburgh, PA (US)

( * ) Notice: Subject to any disclaimer, the term of this patent is extended or adjusted under 35 U.S.C. 154(b) by 0 days.

(21) Appl. No.: 13/873,021

(22) Filed: Apr. 29, 2013

(65) Prior Publication Data

US 2014/0145450 A1 May 29, 2014

Related U.S. Application Data

(60) Provisional application No. 61/687,596, filed on Apr. 27, 2012.

(51) Int. Cl.
*F02B 63/04* (2006.01)
*H02K 7/10* (2006.01)
*H02K 7/18* (2006.01)
*F03G 5/06* (2006.01)

(52) U.S. Cl.
CPC ............ *F03G 5/06* (2013.01); *H02K 7/1853* (2013.01)
USPC ......................................................... 290/1 C

(58) Field of Classification Search
CPC ....... A43B 3/0005; A43B 7/04; A43B 3/0015; F03G 7/08; H02K 33/00; F05B 2220/706
USPC .............................................. 290/1 C; 29/1 C
See application file for complete search history.

(56) References Cited

U.S. PATENT DOCUMENTS

| | | | | |
|---|---|---|---|---|
| 1,272,931 A | * | 7/1918 | Etheridge | 36/2.6 |
| 1,506,282 A | | 10/1923 | Barbieri | 310/75 B |
| 3,534,391 A | * | 10/1970 | Ferdinand | 219/211 |
| 4,674,199 A | | 6/1987 | Lakic | 36/2.6 |
| 4,782,602 A | | 11/1988 | Lakic | 36/2.6 |
| 4,845,338 A | | 7/1989 | Lakic | 219/211 |
| 5,167,082 A | * | 12/1992 | Chen | 36/2.6 |
| 5,367,788 A | * | 11/1994 | Chen | 36/3 B |
| 5,391,080 A | * | 2/1995 | Bernacki et al. | 434/254 |
| 5,495,682 A | | 3/1996 | Chen | 36/2.6 |
| 5,866,987 A | * | 2/1999 | Wut | 315/119 |
| 6,201,314 B1 | | 3/2001 | Landry | 290/54 |
| 6,239,501 B1 | | 5/2001 | Komarechka | 290/1 R |
| 6,255,799 B1 | | 7/2001 | Le et al. | 320/107 |
| 6,281,594 B1 | | 8/2001 | Sarich | 290/1 R |
| 6,744,145 B2 | | 6/2004 | Chang | 290/1 R |
| 6,865,825 B2 | * | 3/2005 | Bailey et al. | 36/88 |
| 6,899,737 B1 | * | 5/2005 | Phillips et al. | 623/52 |

(Continued)

FOREIGN PATENT DOCUMENTS

KR 2009007638 7/2009

*Primary Examiner* — Pedro J Cuevas
(74) *Attorney, Agent, or Firm* — Fox Rothschild LLP

(57) ABSTRACT

The energy harvesting mechanism solves the problem of running out of battery life in remote or inconvenient locations. This invention has been designed to harvest energy from the heel strike phase of walking. The invention involves a mechanism to convert linear to rotational motion, followed by a gear train and electric generator. Harvested energy is stored in a battery to power users' electronic devices.

10 Claims, 1 Drawing Sheet

(56) References Cited

U.S. PATENT DOCUMENTS

| | | | |
|---|---|---|---|
| 7,063,727 B2* | 6/2006 | Phillips et al. | 623/52 |
| 7,081,685 B2 | 7/2006 | Chiu | 290/1 R |
| 7,107,706 B1* | 9/2006 | Bailey et al. | 36/88 |
| 7,186,957 B2* | 3/2007 | Martin | 219/529 |
| 7,204,041 B1* | 4/2007 | Bailey et al. | 36/29 |
| 7,279,011 B2* | 10/2007 | Phillips | 623/53 |
| 7,327,046 B2* | 2/2008 | Biamonte | 290/1 R |
| 7,354,456 B2* | 4/2008 | Phillips | 623/52 |
| 7,395,614 B1* | 7/2008 | Bailey et al. | 36/28 |
| 7,409,784 B2 | 8/2008 | Yeh | 36/136 |
| 7,699,499 B2 | 4/2010 | Liao | 362/276 |
| 7,956,476 B2 | 6/2011 | Yang | 290/1 R |
| 7,956,753 B2* | 6/2011 | Fogg | 340/573.1 |
| 8,087,186 B2 | 1/2012 | Rastegar et al. | 36/2.6 |
| 8,322,876 B2 | 12/2012 | Tseng et al. | 362/103 |
| 8,674,527 B2* | 3/2014 | Fyke et al. | 290/1 R |
| 8,866,314 B2* | 10/2014 | Linevich | 290/1 C |
| 8,872,364 B2* | 10/2014 | Tsai | 290/1 C |
| 2004/0035243 A1* | 2/2004 | Duval | 74/589 |
| 2008/0277552 A1* | 11/2008 | Duval | 248/280.11 |
| 2010/0223813 A1 | 9/2010 | Ozturk | 36/105 |
| 2013/0020986 A1 | 1/2013 | Linzon et al. | 320/107 |
| 2013/0033042 A1 | 2/2013 | Fortier et al. | 290/54 |
| 2013/0104425 A1 | 5/2013 | Kalra-Lall | 36/103 |
| 2013/0185961 A1 | 7/2013 | Tseng | 36/137 |
| 2013/0219743 A1 | 8/2013 | Ye | 36/2.6 |
| 2014/0183873 A1* | 7/2014 | Yoo et al. | 290/1 C |

* cited by examiner

FOOT-POWERED ENERGY HARVESTING MECHANISMS FOR INSOLES AND SHOES

CROSS-REFERENCE TO RELATED APPLICATIONS

The present application is a nonprovisional and claims priority to U.S. Provisional Application No. 61/687,596, filed on Apr. 27, 2012.

Apparatuses for harvesting energy and producing usable power from the heel strike phase and other phases of walking and running gaits.

STATEMENT REGARDING FEDERALLY-SPONSORED RESEARCH AND DEVELOPMENT

Not Applicable

FIELD OF THE INVENTION

This invention relates to power generation via energy harvesting mechanisms for the use of charging batteries and portable electronics.

BACKGROUND OF THE INVENTION

Access to mobile power sources is becoming a necessity for portable electronics users. The need to charge portable electronics like cell phones, radios, GPS, or entertainment devices has been met with backup battery and solar powered solutions. Many people around the world have access to cheap, portable electronics but lack a suitable means to charge them. Foot-powered, mechanical (kinetic) energy harvesting solutions are renewable and universal solutions to on-the-go charging needs.

A charging system based on the present invention could be used in a variety of applications including being placed in insoles and embedded in shoes for charging mobile electronics. These applications include but are not limited to communication devices, medical and survival equipment, location/tracking equipment, sensors, and media electronics. The system could also be used in military and hiking boots to power a GPS, night vision goggles, communication technology and other equipment.

By using mechanical linkages and simple machines in a profile suitable for foot-powered walking motion, the device has a number of advantages over piezoelectric systems and microfludic systems of prior art. Using gears, pulleys, and other simple machines in a footwear profile includes embodiments that fit in the sole of a shoe (i.e. embedded within or built into a shoe) or within an orthotic insole (similar to a cut-to-fit, off-the-shelf insert that can be placed in a shoe).

Other advantages over prior art include the incorporation of continuous or non-continuous drive trains actuated by the heel strike portion of the gait. This includes mechanical systems that optimize on the timing of a gait by extending the time of motion, and thus power generation capabilities, of the device before a second actuating step is induced in the mechanism. A continuous drive train also includes solutions that limit the directionality of motion in any part of the device such that the power generation component spins in a unified direction for the purpose of increasing power output.

The mechanism also has applications in the consumer market for trail and mountain-based sports. Many people are limited in their range of expedition due to lack of battery life in devices such as GPS, radios and other equipment. The mechanism serves as a way to charge these electrical devices while travelling away from a serviceable power grid. The device will enable users to carry fewer batteries while they are on extended trips away from power sources.

The mechanism can also be used as a means to supply power to remote areas in third world countries. This mechanism can store power for a variety of needs of people in remote areas. Including but not limited to lighting at night, communication, and various tools. In addition to being built into a shoe, the mechanism can be built into sandals and other footwear common to underdeveloped nations.

An optimal variation for implementation in soles of shoes is shown in included figures. However, the mechanism is not limited to this application. Any linear to rotational motion can be optimized for energy harvesting using this mechanism, including but not limited to car suspensions, tidal motion, or vibrations from machinery.

SUMMARY OF THE INVENTION

This invention is a mechanism for harvesting energy from the impact of the heel with the ground when walking, running, et cetera. The heel plate moves downward, compressing the support springs, while a pulley system increases the magnitude of displacement, and spins a lever arm, causing rotation of the electric generator. The gear chain further increases this displacement, to increase the power produced by the electric generator as it rotates. In one embodiment, the power generated is stored in a small and efficient rechargeable cell. This battery then powers whatever the user connects to this device.

DETAILED DESCRIPTION OF THE INVENTION

Most portable devices like cell phones and laptops require electronic power. It can be inconvenient and expensive to constantly need to find a power supply or carry backup batteries. The enclosed invention solves this problem by harvesting energy in a step. The developed mechanism consists of a heel contact plate, pulley system and lever arm that converts linear motion to rotational motion, thus providing an actuation technique for the energy generation component, an electrical generator. The enclosed system can be rotated in any way and the order of components, which are described by numbers 1-15 below, can be rearranged whilst maintaining their major functions. The scale of the outlined embodiment is sized for implementation in the sole of a shoe. The mechanism applications extend past use in the sole of a shoe.

The drive plate (11) provides contact area for the actuating heel strike. The plate motion is regulated by side support plates (5). Support springs (3) bias and urge the drive plate (11) against a stop position. The drive plate (11) serves as an actuating member that moves from the stop position to an extended position that is closer to the base than the stop position. Support springs (3) are compressed as the user steps downward, thus moving at least a portion the drive plate (11) to the extended position. As the drive plate (11) moves downward to the extended position, the drive link (8) travels between a first location and a second location in a direction that is generally orthogonal to the direction of the drive plate.

Figure 1:
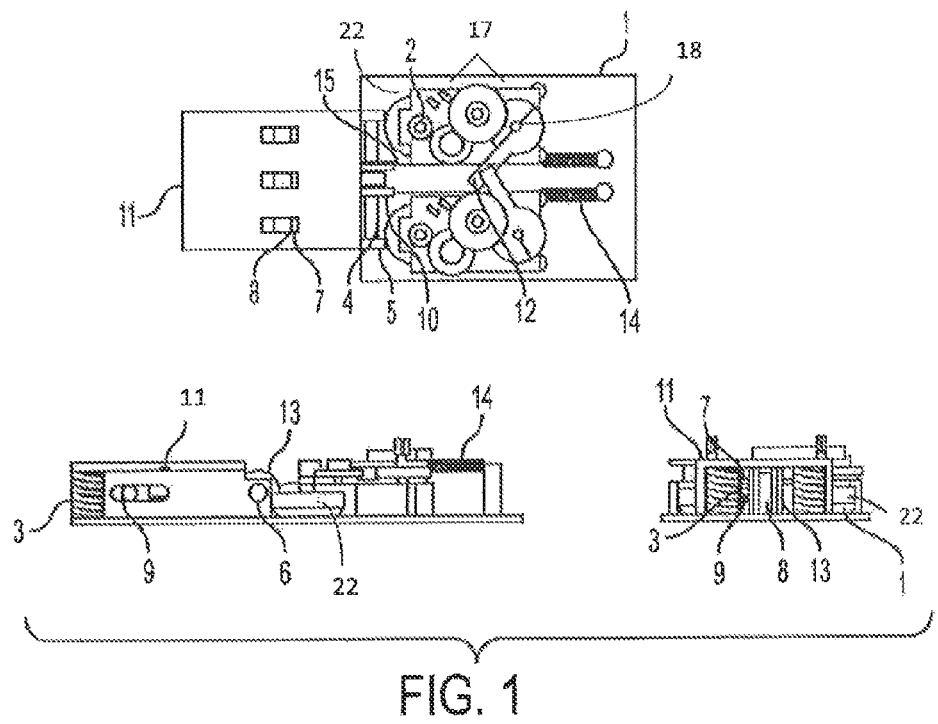
FIG. 1. Details a top view of one embodiment (non-continuous, embedded or insole mechanism) of the assembled invention.
Figure 2:
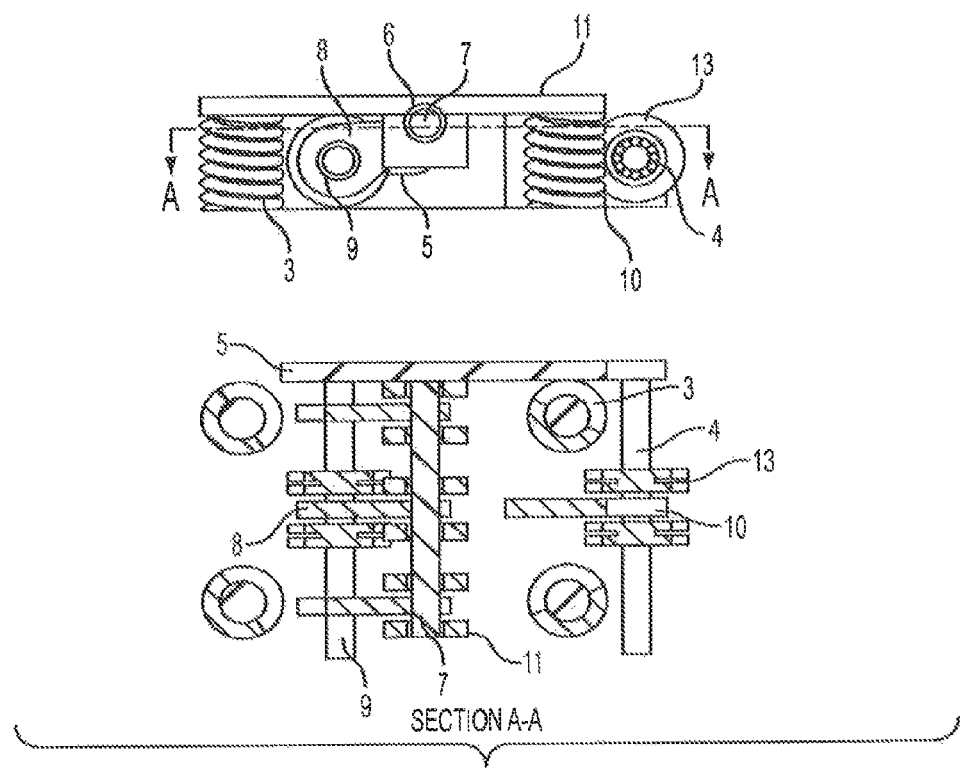
FIG. 2. Depicts one embodiment (non-continuous, embedded or insole mechanism) of the drive mechanism assembly.

For example, referring to FIG. 1, when a heel strikes plate (11) over spring (3), the drive link (8) may move from a first position near the spring (3) to a second position located further away from spring (3). The first location of the drive link (8) is its position when the drive plate (11) is in the stop position. The second location of the drive link (8) is its position when the drive plate (11) is in the extended position. In addition or alternatively, the drive link (8) may angularly pivot about a shaft (7) in response to movement of the drive plate (11) from the extended position to the stop position.

The drive link (8) and drive link main shaft (7) enable motion of the pulley system. The pulley system consists of a main pulley shaft (9), secondary pulley shaft (4), wire rope (15) and cable pulleys (13). Pulleys, slot length, and wire length can be added or subtracted to the system to maximize mechanism efficiency. One or more wire rope to gear train connections (12) each serve as an arm that pivots between first and second positions and actuates the gear train (2). The wire rope (15) is a cable secured to the drive link (8) and that connects the drive link (8) to each arm (12). Relocating components for the purposes of adjusting for shoe size and shoe type is accomplished by adjusting length of the wire rope (15) and wire rope to gear train connection (12).

Movement of the arms (12) causes movement of the gear train (17), which causes rotation of an electric generator (22). Each electric generator (22) may include at least one armature that is rotatably mounted in a stator. The electric generator (22) provides AC current, and rectifiers and amplifiers are used in circuitry to convert to DC power before the produced electrical energy is stored in a rechargeable battery. Some or all of the pulley system, wire rope to gear train connection (12), and the gear train (17) serve as a mechanical linkage that connects the drive link (8) to the armature so that movement of the drive link (8) from a first angular position to a second angular position causes rotation of the armature in the stator to generate electrical current in the armature. For example, when each arm moves from a second position to a first position, it may cause the gear set (17) to rotate the armature. The gear set (17) may include a first gear (2) having a shaft that is connected to an arm (12), a second gear (18) having a shaft that is connected to an armature and any number of additional gears. Movement of the first gear (2) may cause angular movement of the second gear (2) in response to angular movement of the first gear (18). Optionally, the movement of the first gear (18) may correspond to greater angular movement of the second gear (2). When the arms (12) move from a first position to the second position, and then back from the second position to the first position, the angular directions of rotation of a corresponding armature may be the same for each arm movement or may be opposite for each arm movement. Either way, the generator (22) may be activated in response to travel of the drive link (8) from the first position to the second position, and/or from the second position to the first position.

The electric generator provides output power during two phases. The first is described above as the "stepping phase" and compression of the drive plate (11). During the reset phase, the user removes downward pressure on the drive plate (11), causing the system components to move to initial position. Reset springs (14) serve as tension springs that connect the arms (12) to the base (1). Movement of the arms from their first position to their second position will load the reset springs (14) as the drive plate (11) moves to the extended position. When the drive plate (11) returns from the extended position to the stop position, the reset springs (14) return to their first position and push the electric generator in the opposite direction, and support springs (3) push the drive plate (11) upwards. The motion ensures the wire rope (15) remains taught. As the generator moves to initial position, it generates energy in a secondary reset phase. The resetting process is accomplished during the stride phase of a normal person's walking pattern.

The base plate (1) and center support plate (10) outline the area of the mechanism and support all components. Size and shape of the base plate (1) are adjusted per mechanism application. The system components may be provided in a casing that fits within a profile of an orthotic insert, and which can be embedded within an insert or shoe sole. A mechanically drivable energy converter may be secured to the casing and connected to an electrical storage device. Alternatively or in addition, a storage battery may be electrically connected to the generator to store electrical energy in response to activation of the generator.

Potential materials for this invention include light-weight alloys or hard plastics. One embodiment used aluminum for the base and drive plates, steel axles, and rapid prototyped lever arms. Plastic parts can be produced by injection molding or rapid prototyping. Alloy components can be manufactured using a variety of standard machining techniques.

What we claim is:

1. A portable electric power generator that converts linear mechanical motion into electric power, said portable generator comprising:
    a base;
    an actuating member that is moveable between a stop position that is relatively away from the base and a compressed position that is relatively toward the base;
    a biasing member that links the actuating member to the base and that biases the actuating member toward the stop position;
    a drive link that travels in a direction that is generally orthogonal to the direction of movement of said actuating member;
    at least one electrical generator;
    a mechanical linkage that connects said drive link to said generator and that activates said generator in response to the travel of said drive link from a first position to a second position; and
    a storage battery that is electrically connected to said generator and that stores electrical energy in response to the activation of said generator.

2. A portable electric power source that converts linear mechanical motion into electric power, said portable power source generator comprising:
    a base;
    an actuating member that is moveable between a stop position that is relatively away from said base and a compressed position that is relatively closer to said base than said stop position;
    a compressible member that links the actuating member to the base;
    a drive link that travels between first and second locations, the movement of said drive link defining a direction that is generally orthogonal to the direction of movement of said actuating member from said stop position toward said compressed position, the first location of said drive link corresponding to the stop position of said actuating member and the second location of said drive link corresponding to the compressed position of said actuating member;
    at least one electrical generator having an armature and a stator;
    a mechanical linkage that mechanically connects said drive link to the armature of said generator and that rotates said armature in response to the travel of said drive link from said first location to said second location; and a storage battery that is electrically connected to said armature and that stores electrical energy in response to the rotation of said armature.

3. The portable electric power source of claim 2 wherein said mechanical linkage includes:

at least one linear member that is connected to said drive link;

an arm that is connected to said linear member, said arm being located in a first position at times when said actuating member is positioned in said stop position and said arm being located in a second position at times when said actuating member is in said compressed position, said arm pivoting between said first and second positions in response to the movement of said actuating member between said stop position and said compressed position; and a gear set that is connected to said arm and to said electrical generator such that the movement of said arm from the first position to the second position causes said gear set to rotate the armature of said generator.

4. The portable electric power source of claim 3 wherein said linear member comprises a cable that is secured to said drive link and to said arm such that the movement of said drive link from said first location to said second location causes the movement of said arm from said first position to said second position.

5. The portable electric power source of claim 4 wherein said cable is wound through at least one pulley to provide mechanical advantage against the movement of said arm.

6. The portable electric power source of claim 3, wherein the compressible member comprises:

at least one tension spring that is connected to said arm and to said base, wherein the pivotal movement of said arm from said first position to said second position loads said tension spring, said tension spring moving said arm from said second position to said first position at times when said actuating member moves from said extended compressed position to said stop position.

7. The portable electric power source of claim 6 wherein the movement of said arm from said second position to said first position causes said gear set to rotate the armature of said generator in the angular direction that is opposite from the angular direction of the armature at times when said arm moves from said first position to said second position.

8. The portable electric power source of claim 3 wherein said gear set includes a first gear having a shaft that is connected to the arm and a second gear having a shaft that is connected to the generator, said gear set causing angular movement of said second gear in response to the angular movement of said first gear.

9. The portable electric power source of claim 8 wherein a given angular movement of said first gear corresponds to a greater angular movement of said second gear.

10. The portable electric power source of claim 3 wherein, at times when said arm moves from said second position to said first position, the armature of said generator rotates in the same angular direction as the angular direction of the armature at times when said arm moves from said first position to said second position.

\* \* \* \* \*